United States Patent Office 3,450,747
Patented June 17, 1969

3,450,747
PREPARATION OF AROYL ISOCYANATES AND ARYL ISOCYANATOFORMATES
Lowell R. Smith, St. Louis, and Angelo John Speziale, Creve Coeur, Mo., assignors to Monsanto Company, St. Louis, Mo., a corporation of Delaware
No Drawing. Continuation-in-part of application Ser. No. 221,302, Sept. 4, 1962. This application May 7, 1965, Ser. No. 454,209
The portion of the term of the patent subsequent to Oct. 19, 1982, has been disclaimed
Int. Cl. C07c 119/04, 135/00; A01n 9/20
U.S. Cl. 260—479     14 Claims

ABSTRACT OF THE DISCLOSURE

Method of making aroyl isocyanates from oxalyl chloride and an aroylamide and aryl isocyanatoformates from oxalyl chloride and an aryl carbamate, the respective methods involving heating the reactants under anhydrous conditions to effect evolution of hydrogen chloride. The respective end products are precursors for a wide variety of useful N-(aroyl) carbamate esters, N-(aroyl) substituent ureas, imidodicarboxylates and allophanates.

---

This application is a continuation-in-part of copending application Ser. No. 221,302, filed Sept. 4, 1962, and now abandoned.

This invention relates to a novel process whereby useful isocyanates of the general formula

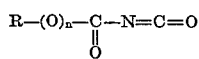

wherein $n$ is a number from 0 to 1, specifically, (1) aroyl isocyanates of the formula

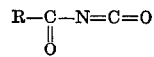

and (2) aryl isocyanatoformates of the formula

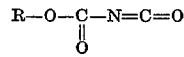

wherein the foregoing formulae R is an aromatic hydrocarbyl of the benzene series having from 6 to 11 carbon atoms (e.g., phenyl, tolyl, xylyl, ethylphenyl, propylphenyl, propyltolyl, butylphenyl, amylphenyl, and the various isomeric forms thereof) and said aromatic hydrocarbyl having one or more substituents on the aromatic nucleus thereof such as bromo, chloro, fluoro, nitro, methoxy, ethoxy, and various mixtures thereof (e.g., bromophenyl, dibromophenyl, tribromophenyl, chlorophenyl, dichlorophenyl, trichlorophenyl, fluorophenyl, bromochlorophenyl, bromodichlorophenyl, nitrophenyl, dinitrophenyl, nitrochlorophenyl, nitrobromophenyl, nitrodichlorophenyl, anisyl, dimethoxyphenyl, phenetyl, diethoxyphenyl, ar-chlorotolyl, ar-bromotolyl, ar-dichlorotolyl, ar-nitrotolyl, ar-dinitrotolyl, ar-chloro-ar-nitrotolyl, ar-methylanisyl, ar-chloroanisyl, ar-bromophenetyl, etc.) are prepared. These materials are particularly useful in organic synthesis.

The respective isocyanates (1) and (2) aforedescribed are prepared by heating under anhydrous conditions to effect evolution of hydrogen chloride a mixture of at least one mole of oxalyl chloride with one mole of an amide of the formula

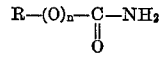

wherein R and $n$ have the aforedescribed significance in the presence of an inert organic liquid having a boiling point below that of the isocyanate end product, and thereafter distilling from the resulting reaction mass the said isocyanates. It is apparent from the foregoing amide reactant formula that when $n$ is 0 the reactant is an aroylamide, whereas when $n$ is 1 the reactant is an aryl carbamate.

A wide range of reaction conditions can be employed in preparing these isocyanates provided the reaction conditions result in the evolution of hydrogen chloride which is a by-product of the reaction. In general it is preferable to reflux the reaction mixture and while refluxing to remove the hydrogen chloride as it forms. Refluxing temperatures in the range of from about 35° C. to about 100° C. have been found highly desirable. With respect to pressure either pressures above or below atmospheric pressure can be employed, however in general it is satisfactory to employ atmospheric pressure.

Although theoretically the amide reactant and oxalyl chloride combine in equimolecular amounts to produce the desired isocyanate it is advantageous to employ an excess of oxalyl chloride, for example up to about two moles per mole of the amide reactant.

The inert organic liquid employed in the process of this invention will be a liquid hydrocarbon or a liquid chlorine substituted hydrocarbon or mixtures thereof having a boiling point below that of the isocyanate end product, e.g., n-pentane, n-hexane, 2-methylpentane, 3-methylpentane, n-heptane, 2-methylhexane, benzene, toluene, xylene, cyclohexane, dichloromethane, 1,1-dichloroethane, 1,2-dichloroethane, chloroform, carbon tetrachloride, isobutyl chloride, chlorobenzene, chlorotoluene, and mixtures thereof. In general it is preferable that the amount of said inert organic liquid present throughout the course of the reaction be that at least sufficient to maintain the isocyanate produced in solution.

The isocyanates prepared in accordance with the process of this invention are readily hydrolyzed and therefore when stored should be kept free of moisture, as for example stored under refrigerative conditions as such or dissolved in an inert anhydrous organic liquid.

The preferred isocyanates of this invention are those obtained by reacting oxalyl chloride in accordance with the process of this invention with an amide reactant of the formula

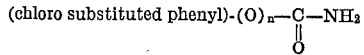

wherein $n$ has the aforedescribed significance, but preferably 0, and wherein said chloro substituted phenyl has from 1 to 3 chlorine substituents, e.g., 2-chlorobenzoylamide, 3-chlorobenzoylamide, 4-chlorobenzoylamide, 2,4-dichlorobenzoylamide, 3,4-dichlorobenzoylamide, 2,4,5-trichlorobenzoylamide, and the various chloro substituted position isomers thereof, and 2-chlorophenyl carbamate, 3-chlorophenyl carbamate, 4-chlorophenyl carbamate, 2,4-dichlorophenyl carbamate, 3,4-dichlorophenyl carbamate, 2,4,5-trichlorophenyl carbamate, and the various chloro substituted position isomers thereof. The isocyanates produced therefrom are of the formula

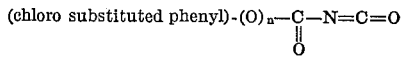

wherein said chloro substituted phenyl and $n$ have the aforedescribed significance. These chloro substituted compounds are in particular useful in organic synthesis for herbicidally active materials.

The isocyanates of this invention react with a variety of organic compounds to provide a large number of useful compounds. For example upon reacting an isocyanate of this invention in substantially equimolecular proportions in a suitable inert organic liquid in a fluid system, i.e., at a reaction temperature above the freezing point of the system up to and including the boiling point of the system, according to well known procedures with either:

(1) An aliphatic alcohol or aliphatic mercaptan of the formula R'XH where X is sulfur or oxygen and wherein R' is a $C_{1-5}$ aliphatic radical (e.g., methyl, ethyl, propyl, amyl, allyl, butenyl, propynyl, 2-chloroethyl, 2,3-dichloropropyl, 2-chloroallyl, 3-chloroally, 2,3-dichloroallyl, 3,3-dichloroallyl, 2,3,3-trichloroallyl, 3-chlorobut-2-enyl, 3,4-dichloropent-2-enyl, and the various isomeric forms thereof) provide esters of the formula

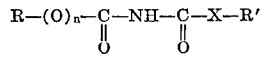

wherein R, $n$, X and R' have the aforedescribed significance. Illustrative of such esters are:

methyl N-(2,4-dichlorobenzoyl)carbamate,
2-chloroethyl N-(4-fluorobenzoyl)carbamate,
isopropyl N-(2,4-dichlorobenzoyl)carbamate,
methyl N-(2-nitrobenzoyl)carbamate,
allyl N-(3,4-dichlorobenzoyl)carbamate,
2-chloroallyl N-(2,4,5-trichlorobenzoyl)carbamate,
propynyl N-(3,4-dichlorobenzoyl)carbamate,
2,3-dichloroallyl N-(benzoyl)carbamate,
2-chloroethyl N-(2,4-dichlorobenzoyl)carbamate,
3,3-dichloroallyl N-(4-methoxybenzoyl)carbamate,
3-bromopropyl N-(3,4-dibromobenzoyl)carbamate,
2-chloroethyl N-(2-chloro-4-nitrobenzoyl)carbamate,
ethyl N-(2,4-dichlorobenzoyl)carbamate,
2-chloroallyl N-(2,4-dichlorobenzoyl)thiolocarbamate,
methyl N-(3,4-dichlorobenzoyl)thiolocarbamate,
methyl N-(3,4-dichlorobenzoyl)carbamate,
isopropyl N-(3,4-dichlorobenzoyl)carbamate,
2-chloroethyl N-(3,4-dichlorobenzoyl)carbamate,
2-chloroallyl phenyl imidodicarboxylate,
methyl 2,4-dichlorophenyl imidodicarboxylate,
2,3-dichloroallyl 4-chlorophenyl imidodicarboxylate,
2-chloroethyl 4-nitrophenyl imidodicarboxylate,
2,3-dichloropropyl 2-chloro-4-nitrophenyl imidodicarboxylate,
di(2-nitrophenyl) imidodicarboxylate,
2,3,3-trichloroallyl 3-ethoxyphenyl imidodicarboxylate,
2,2-dichloroethyl 3-bromophenyl imidodicarboxylate which materials are herbicidally active and/or insecticidally active;

(2) Or a substituted phenol or thiophenol such as the various chlorophenols, chlorothiophenols, nitrophenols and chloronitrophenols provide esters of the formula

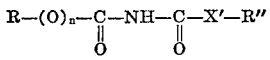

wherein R and $n$ have the aforedescribed significance and wherein X' is sulfur or oxygen and wherein R'' is phenyl having one or more chlorine substituents and/or nitro substituents, which materials, as for example:

4-chlorophenyl N-(4-chlorobenzoyl)carbamate,
4-chlorophenyl N-(3,4-dichlorobenzoyl)carbamate,
2,4-dichlorophenyl N-(2,4-dichlorobenzoyl)carbamate,
2,4,5-trichlorophenyl N-(benzoyl)carbamate,
2-nitrophenyl N-(4-chlorobenzoyl) carbamate,
4-nitrophenyl N-(2-chloro-4-nitrobenzoyl)carbamate,
2-chloro-4-nitrophenyl N-(3-bromobenzoyl)carbamate,
4-chlorophenyl N-(2,4-dichlorobenzoyl)thiolocarbamate,
4-chloropehnyl N-(4-methoxybenzoyl)thiolocarbamate,
2,4-dichlorophenyl N-(2,4-dichlorobenzoyl)thiolocarbamate,
di(2,4-dichlorophenyl)imidodicarboxylate,
di(4-nitrophenyl)imidodicarboxylate, are herbicidally active and/or insecticidally active;

(3) Or either a secondary heterocyclic amine such as morpholine, hexamethyleneimine, piperidine, etc., or a primary or secondary amine of the formula A—NH—B wherein A is hydrogen or a $C_{1-5}$ aliphatic radical (e.g., methyl, ethyl, propyl, amyl, allyl, butenyl, propynyl, 2- chloroethyl, 2,3-dichloropropyl, 2-chloroallyl, 3-chloroallyl, 2,3-dichloroallyl, 2,3,3-trichloroallyl, 3-chlorobut-2-enyl, and the various isomeric forms thereof) or a phenyl radical or an alkyl substituted phenyl radical or a chlorine substituted phenyl radical and wherein B is a $C_{1-5}$ aliphatic radical (e.g., methyl, ethyl, isopropyl, amyl, allyl, butenyl, propynyl, 2-chloroethyl, 2,3-dichloropropyl, 2-chloroallyl, 3-chlorobut-2-enyl, etc.) or a phenyl radical or an alkyl substituted phenyl radical or a chlorine substituted phenyl radical, provide substituted ureas such as:

N-(2,4-dichlorobenzoyl)-N',N'-diallyl carboxamide
N-(2,4-dichlorobenzoyl)-1-aziridine carboxamide,
N-(2,4,5-trichlorobenzoyl)-N'-allyl carboxamide,
N-(3,4-dichlorobenzoyl)-4-morpholine carboxamide,
N-(4-nitrobenzoyl)-N',N'-diethyl carboxamide,
N-(3,4-dichlorobenzoyl)-N'-(3,4-dichlorophenyl)urea,
N-(4-nitrobenzoyl)-N'-phenyl-N'-methyl urea
N-(2,4-dichlorobenzoyl)-N'-isopropyl-N'propynyl urea,
phenyl 4-allylallophanate,
4-chlorophenyl 4,4-diallylallophanate,
2,4-dichlorophenyl 4,4-diethylallophanate,
2,4,5-trichlorophenyl 4-phenyl-4-methylallophanate,
4-nitrophenyl 4-(2-chloroallyl)allophanate,
2-nitrophenyl 4-(2-chloroallyl)allophanate, which materials are herbicidally active and/or insecticidally active.

As illustrative of the method of manufacture of the isocyanates of this invention and the preparation of useful derivatives thereof is the following:

EXAMPLE I

To a suitable reaction vessel equipped with a thermometer, agitator and reflux condenser is charged at room temperature 12.1 parts by weight of benzoylamide, 13.0 parts by weight of oxalyl chloride and 125 parts by weight of 1,2-dichloroethane. The so charged mass is heated to reflux (about 83° C.) while agitating and then refluxed for 16 hours. Thereafter the resulting mass is subjected to vacuum distillation and the cut (11.0 parts by weight) taken at 97–98° C. at 23 mm. of mercury is benzoyl isocyanate which is identical to an authentic sample of benzoyl isocyanate.

EXAMPLE II

Employing the procedure of Example I but replacing benzoylamide with an equimolecular amount of 4-isopropylbenzoyl amide there is obtained 4-isopropylbenzoyl isocyanate.

EXAMPLE III

Employing the procedure of Example I but replacing benzoylamide with an equimolecular amount of 4-t-butylbenzoylamide there is obtained 4-t-butylbenzoyl isocyanate.

EXAMPLE IV

To a suitable reaction vessel equipped with a thermometer, agitator and reflux condenser is charged at room temperature 82.7 parts by weight of 3,4-dichlorobenzoylamide, 64.0 parts by weight of oxalyl chloride and 266 parts by weight of methylene chloride. The so charged mass is then heated to reflux while agitating then refluxed for 18 hours. Thereafter the resulting mass is subjected to vacuum distillation and the cut (91.0 parts by weight) taken at 105.5° C. at 1.6 mm. of mercury is 3,4-dichlorobenzoyl isocyanate which liquid on standing at room temperature solidified to a white solid.

EXAMPLE IV-A

To a suitable reaction vessel is charged 4.3 parts by weight of 3,4-dichlorobenzoyl isocyanate dissolved in 78 parts by weight of diethylether. While at room temperature and with agitation there is added 2.9 parts by weight of 3,4-dichloroaniline. The precipitate is filtered off and then recrystallized from methanol. The white solid is N-(3,4-dichlorobenzoyl)-N′-(3,4-dichlorophenyl) urea, M.P. 202.5–203.5. This substituted urea is a contact herbicide against broad leaf plants.

EXAMPLE V

Employing the procedure of Example IV but replacing 3,4-dichlorobenzoylamide with an equimolecular amount of 2,4,5-trichlorobenzoylamide there is obtained 2,4,5-trichlorobenzoyl isocyanate.

EXAMPLE VI

Employing the procedure of Example I but replacing benzoylamide with an equimolecular amount of 4-ethoxybenzoyl amide there is obtained 4-ethoxybenzoyl isocyanate.

EXAMPLE VII

Employing the procedure of Example I but replacing benzoylamide with an equimolecular amount of 3-methylbenzoylamide there is obtained 3-methylbenzoyl isocyanate (B.P. 65–70° C. at 0.7 mm. of mercury).

EXAMPLE VIII

Employing the procedure of Example I but replacing benzoylamide with an equimolecular amount of 3,5-dimethylbenzoyl amide there is obtained 3,5-dimethylbenzoyl isocyanate.

EXAMPLE IX

Employing the procedure of Example I but replacing benzoylamide with an equimolecular amount of 4-methylbenzoylamide there is obtained 4-methylbenzoyl isocyanate (B.P. 61–67° C. at 0.75 mm. of mercury).

EXAMPLE X

To a suitable reaction vessel equipped with a thermometer, agitator and reflux condenser is charged at room temperature 13.0 parts by weight of 2-chlorobenzoylamide, 13.0 parts by weight of oxalyl chloride and 125 parts by weight of 1,2-dichloroethane. The so charged mass is heated to reflux while agitating and then refluxed for 18 hours. Thereafter the resulting mass is subjected to vacuum distillation and the cut taken at 80–85° C. at 0.4 mm. of mercury is 2-chlorobenzoyl. The allyl alcohol derivative of this isocyanate, i.e., allyl N-(2-chlorobenzoyl)carbamate was particularly effective as a pre-emergent herbicide against sugar beets.

EXAMPLE XI

Employing the procedure of Example X but replacing 2-chlorobenzoylamide with an equimolecular amount of 3-chloro-4-methylbenzoyl amide there is obtained 3-chloro-4-methylbenzoyl isocyanate.

EXAMPLE XII

Employing the procedure of Example X but replacing 2-chlorobenzoylamide with an equimolecular amount of 2-bromobenzoylamide there is obtained 2-bromobenzoyl isocyanate.

EXAMPLE XIII

To a suitable reaction vessel equipped with a thermometer, agitator and reflux condenser is charged at room temperature 79.0 parts by weight of 4-chlorobenzoylamide, 68.0 parts by weight of oxalyl chloride and 266 parts by weight of methylene chloride. The so charged mass is then heated to reflux while agitating then refluxed for 18 hours. Thereafter the resulting mass is subjected to vacuum distillation and the cut taken at 80–90° C. at 0.75 to 2.0 mm. of mercury is 4-chlorobenzoyl isocyanate.

EXAMPLE XIII-A

To a suitable reaction vessel is charged 3.9 parts by weight of 4-chlorobenzoyl isocyanate dissolved in 78 parts by weight of diethylether. While at room temperature and with agitation there is added 2.2 parts by weight of 2,3-dichloroallyl alcohol. The precipitate is filtered off and identified as 2,3-dichloroallyl N-(4-chlorobenzoyl)carbamate. This substituted urea is a contact herbicide against broad leaf plants.

EXAMPLE XIV

Employing the procedure of Example XIII but replacing 4-chlorobenzoylamide with an equimolecular amount of 4-fluorobenzoylamide there is obtained 4-fluorobenzoyl isocyanate.

EXAMPLE XV

To a suitable reaction vessel equipped with a thermometer, agitator and reflux condenser is charged at room temperature 16.6 parts by weight of 2-nitrobenzoylamide, 13.0 parts by weight of oxalyl chloride and 200 parts by weight of 1,2-dichloroethane. The so charged mass is heated to reflux while agitating and then refluxed for 16 hours. Thereafter the resulting mass is subjected to vacuum distillation and the cut taken at 120–122° C. at 0.5 mm. of mercury is 2-nitrobenzoyl isocyanate. This isocyanate upon reacting with methanol provides methyl N-(2-nitrobenzoyl) carbamate which exhibited excellent pre-emergent herbicidal control of broad leaf and narrow leaf plants.

EXAMPLE XVI

Employing the procedure of Example XV but replacing 2-nitrobenzoylamide with an equimolecular amount of 3-nitrobenzoyl amide there is obtained 3-nitrobenzoyl isocyanate (B.P. 120–125° C. at 0.7 mm. of mercury).

EXAMPLE XVII

Employing the procedure of Example XV but replacing 2-nitrobenzoylamide with an equimolecular amount of 4-nitrobenzoylamide there is obtained 4-nitrobenzoyl isocyanate (B.P. about 122° C. at 1.5 mm. of mercury).

EXAMPLE XVIII

To a suitable reaction vessel equipped with a thermometer, agitator and reflux condenser is charged at room temperature 82.7 parts by weight of 2,4-dichlorobenzoylamide, 64.0 parts by weight of oxalyl chloride and 266 parts by weight of methylene chloride. The so charged mass is then heated to reflux while agitating then refluxed for 18 hours. Thereafter the resulting mass is subjected to vacuum distillation and the cut taken at 100–105° C. at 1.7 mm. of mercury is 2,4-dichlorobenzoyl isocyanate.

EXAMPLE XIX

Employing the procedure of Example XVIII but replacing 2,4-dichlorobenzoylamide with an equimolecular amount of 2,4-dibromobenzoylamide there is obtained 2,4-dibromobenzoyl isocyanate.

EXAMPLE XX

Employing the procedure of Example XVIII but replacing 2,4-dichlorobenzoylamide with an equimolecular amount of 2-chloro-4-bromobenzoyl amide there is obtained 2-chloro-4-bromobenzoyl isocyanate.

EXAMPLE XXI

Employing the procedure of Example XVIII but replacing 2,4-dichlorobenzoylamide with an equimolecular amount of 2-chloro-4-nitrobenzoylamide there is obtained 2-chloro-4-nitrobenzoyl isocyanate.

EXAMPLE XXII

Employing the procedure of Example I but replacing benzoylamide with an equimolecular amount of 2-methylbenzoylamide there is obtained 2-methylbenzoyl isocyanate B.P. 50–55° C. at 0.75 mm. of mercury).

EXAMPLE XXIII

Employing the procedure of Example I but replacing benzoylamide with an equimolecular amount of 3-methoxybenzoylamide there is obtained 3-methoxybenzoyl isocyanate.

EXAMPLE XXIV

To a suitable reaction vessel equipped with a thermometer, agitator and reflux condenser is charged at room temperature 41.1 parts by weight of phenyl carbamate, 44.4 parts by weight of oxalyl chloride and 500 parts by weight of 1,2-dichloroethane. The so charged mass is heated to reflux while agitating and then refluxed for 20 hours. Thereafter the resulting mass is subjected to vacuum distillation and the cut (32.8 parts by weight) taken at 70–75° C. at 0.25 mm. of mercury is phenyl isocyanatoformate. This isocyanatoformate upon reacting with, respectively, allyl amine and 2-chlorallyl alcohol gave respectively phenyl 4-allyallophanate and 2-chloroallyl phenyl imidodicarboxylate, both of which displayed insecticidal activity against the common house fly.

EXAMPLE XXV

Employing the procedure of Example XXIV but replacing phenyl carbamate with an equimolecular amount of 4-chlorophenyl carbamate there is obtained 4-chlorophenyl isocyanatoformate.

EXAMPLE XXVI

Employing the procedure of Example XXIV but replacing phenyl carbamate with an equimolecular amount of 2,4-dichlorophenyl carbamate there is obtained 2,4-dichlorophenyl isocyanatoformate.

EXAMPLE XXVII

Employing the procedure of Example XXIV but replacing phenyl carbamate with an equimolecular amount of 4-nitrophenyl carbamate there is obtained 4-nitrophenyl isocyanatoformate.

EXAMPLE XXVIII

Employing the procedure of Example XXIV but replacing phenyl carbamate with an equimolecular amount of 3-methylphenyl carbamate there is obtained 3-methylphenyl isocyanatoformate.

EXAMPLE XXIX

Employing the procedure of Example XXIV but replacing phenyl carbamate with an equimolecular amount of 2,4,5-trichlorophenyl carbamate there is obtained 2,4,5-trichlorophenyl isocyanatoformate.

EXAMPLE XXX

Employing the procedure of Example XXIV but replacing phenyl carbamate with an equimolecular amount of 4-bromophenyl carbamate there is obtained 4-bromophenyl isocyanatoformate.

EXAMPLE XXXI

Employing the procedure of Example XXIV but replacing phenyl carbamate with an equimolecular amount of 2-chloro-4-nitrophenyl carbamate there is obtained 2-chloro-4-nitrophenyl isocyanatoformate.

EXAMPLE XXXII

Employing the procedure of Example XXIV but replacing phenyl carbamate with an equimolecular amount of p-anisyl carbamate there is obtained p-anisyl isocyanatoformate.

The terminus of the reaction is readily determined by observing the cessation of evolution of hydrogen chloride. In the reaction step between the amide and the oxalyl chloride it is highly desirable that the inert organic liquid employed have a boiling point below that of the desired isocyanate product. In instances wherein a precipitate forms either in the reaction step or during the distillation operation or any time therebetween it is usually desirable to add sufficient inert organic liquid of any of the aforedescribed types to dissolve the precipitated solids. In recovering the isocyanate product it is preferable to conduct the distillation operation under reduced pressure, e.g., at less than 50 mm. of mercury, and which pressure permits of a distillation temperature of not more than 150° C.

While this invention has been described with respect to certain embodiments it is to be understood that it is not so limited and that variations and modifications thereof obvious to those skilled in the art can be made without departing from the spirit or scope of this invention.

What is claimed is:

1. The method of making an isocyanate of the formula

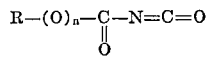

wherein $n$ is a number from 0 to 1 and wherein R is selected from the group consisting of (1) aromatic hydrocarbyl having from 6 to 11 carbon atoms selected from the group consisting of phenyl and alkyl substituted phenyl and (2) said aromatic hydrocarbyl (1) having substituents on the aromatic nucleus thereof selected from the group consisting of bromo, chloro, fluoro, nitro, methoxy and ethoxy, which comprises heating under anhydrous conditions to effect evolution of hydrogen chloride a mixture of at least one mole of oxalyl chloride with one mole of an amide of the formula

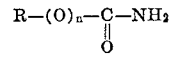

wherein R and $n$ have the aforedescribed significance, in the presence of an inert organic liquid having a boiling point below that of the said isocyanate, and thereafter distilling from the resulting reaction mass the said isocyanate.

2. The method of making a chlorobenzoyl isocyanate of the formula

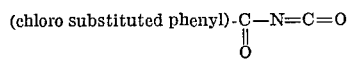

wherein said chloro substituted phenyl has from 1 to 3 chlorine substituents, which comprises bringing together under anhydrous conditions one mole of a chlorobenzoylamide of the formula

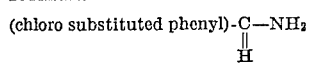

wherein said chloro substituted phenyl has the aforedescribed significance, at least one mole of oxalyl chloride and an inert organic liquid having a boiling point below that of said chlorobenzoyl isocyanate, refluxing the said mixture and while refluxing the said mixture removing the hydrogen chloride by-product as it forms, and thereafter distilling from the resulting reaction mass the said chlorobenzoyl isocyanate.

3. The method of claim 2 wherein the amount of the said inert organic liquid present throughout the course of the refluxing being that at least sufficient to maintain the said chlorobenzoyl isocyanate produced in solution.

4. The method of claim 3 wherein the refluxing temperature is in the range of from about 35° C. to about 100° C.

5. The method of making a nitrobenzoyl isocyanate of the formula

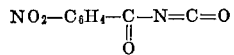

which comprises bringing together under anhydrous conditions one mole of a nitrobenzoylamide of the formula

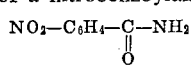

at least one mole of oxalyl chloride and an inert organic liquid having a boiling point below that of said nitrobenzoyl isocyanate, refluxing the said mixture and while refluxing the said mixture removing the hydrogen chloride by-product as it forms, and thereafter distilling from the resulting reaction mass the said nitrobenzoyl isocyanate.

6. The method of making 3,4-dichlorobenzoyl isocyanate which comprises bringing together one mole of 3,4-dichlorobenzoylamide, from one to two moles of oxalyl chloride and an inert chlorine substituted hydrocarbon having a boiling point below that of 3,4-dichlorobenzoyl isocyanate, refluxing the said mixture and while refluxing the said mixture removing the hydrogen chloride by-product as it forms, and thereafter distilling from the reaction mass said 3,4-dichlorobenzoyl isocyanate.

7. The method of making 4-chlorobenzoyl isocyanate which comprises bringing together one mole of 4-chlorobenzoylamide, from one to two moles of oxalyl chloride and an inert chlorine substituted hydrocarbon having a boiling point below that of 4-chlorobenzoyl isocyanate, refluxing the said mixture and while refluxing the said mixture removing the hydrogen chloride by-product as it forms, and thereafter distilling from the reaction mass said 4-chlorobenzoyl isocyanate.

8. The method of making 2-nitrobenzoyl isocyanate which comprises bringing together one mole of 2-nitrobenzoylamide, from one to two moles of oxalyl chloride and an inert chlorine substituted hydrocarbon having a boiling point below that of 2-nitrobenzoyl isocyanate, refluxing the said mixture and while refluxing the said mixture removing the hydrogen chloride by-product as it forms, and thereafter distilling from the reaction mass said 2-nitrobenzoyl isocyanate.

9. The method of making 2,4-dichlorobenzoyl isocyanate which comprises bringing together one mole of 2,4-dichlorobenzoylamide, from one to two moles of oxalyl chloride and an inert chlorine substituted hydrocarbon having a boiling point below that of 2,4-dichlorobenzoyl isocyanate, refluxing the said mixture and while refluxing the said mixture removing the hydrogen chloride by-product as it forms, and thereafter distilling from the reaction mass said 2,4-dichlorobenzoyl isocyanate.

10. The method of making a chlorophenyl isocyanatoformate of the formula $$\text{(chloro substituted phenyl)-O-}\underset{\underset{O}{\|}}{C}\text{-N=C=O}$$

wherein chloro substituted phenyl has from 1 to 3 chlorine substituents which comprises bringing together under anhydrous conditions one mole of a chlorophenyl carbamate of the formula $$\text{(chloro substituted phenyl)-O-}\underset{\underset{O}{\|}}{C}\text{-NH}_2$$

wherein said chloro substituted phenyl has the aforedescribed significance, at least one mole of oxalyl chloride and an inert organic liquid having a boiling point below that of said isocyanatoformate, refluxing the said mixture and while refluxing the said mixture removing the hydrogen chloride by-product as it forms, and thereafter distilling from the resulting reaction mass the said isocyanatoformate.

11. The method of making phenyl isocyanatoformate which comprises bringing together one mole of phenyl carbamate, from one to two moles of oxalyl chloride and an inert chlorine substituted hydrocarbon having a boiling point below that of phenyl isocyanatoformate, refluxing the said mixture and while refluxing the said mixture removing the hydrogen chloride by-product as it forms, and thereafter distilling from the reaction mass said phenyl isocyanatoformate.

12. The method of making 4-chlorophenyl isocyanatoformate which comprises bringing together one mole of 4-chlorophenyl carbamate, from one to two moles of oxalyl chloride and an inert chlorine substituted hydrocarbon having a boiling point below that of 4-chlorophenyl isocyanatoformate, refluxing the said mixture and while refluxing the said mixture removing the hydrogen chloride by-product as it forms, and thereafter distilling from the reaction mass said 4-chlorophenyl isocyanatoformate.

13. The method of making 2,4-dichlorophenyl isocyanatoformate which comprises bringing together one mole of 2,4-dichlorophenyl carbamate, from one to two moles of oxalyl chloride and an inert chlorine substituted hydrocarbon having a boiling point below that of 2,4-dichlorophenyl isocyanatoformate, refluxing the said mixture and while refluxing the said mixture removing the hydrogen chloride by-product as it forms, and thereafter distilling from the reaction mass said 2,4-dichlorophenyl isocyanatoformate.

14. The method of making a nitrophenyl isocyanatoformate of the formula $$\text{NO}_2\text{-C}_6\text{H}_4\text{-O-}\underset{\underset{O}{\|}}{C}\text{-N=C=O}$$

which comprises bringing together under anhydrous conditions one mole of a nitrophenyl carbamate of the formula $$\text{NO}_2\text{-C}_6\text{H}_4\text{-O-}\underset{\underset{O}{\|}}{C}\text{-NH}_2$$

at least one mole of oxalyl chloride and an inert organic liquid having a boiling point below that of said isocyanatoformate, refluxing the said mixture and while refluxing the said mixture removing the hydrogen chloride by-product as it forms, and thereafter distilling from the resulting reaction mass the said isocyanatoformate.

References Cited

UNITED STATES PATENTS 3,213,135  10/1965  Speziale et al.

LORRAINE A. WEINBERGER, Primary Examiner.

H. C. WEGNER, Assistant Examiner.

U.S. Cl. X.R.

71—111, 119; 260—455, 471, 545, 553, 999